United States Patent

Nakada et al.

[11] Patent Number: 6,042,229
[45] Date of Patent: Mar. 28, 2000

[54] DETACHABLE PORTION FOR A HARD CONTACT LENS AND HARD CONTACT LENS COMPOSITE EMPLOYING THE SAME

[75] Inventors: Kazuhiko Nakada; Akihisa Sugiyama, both of Kasugai, Japan

[73] Assignee: Menicon Co., Ltd., Nagoya, Japan

[21] Appl. No.: 09/089,500

[22] Filed: Jun. 3, 1998

[30] Foreign Application Priority Data

Jun. 27, 1997 [JP] Japan .................................. 9-172239

[51] Int. Cl.⁷ ..................................................... G02C 7/04
[52] U.S. Cl. ...................... 351/160 R; 351/172; 523/106
[58] Field of Search ........................ 351/160 R, 160 H, 351/161–167, 173–176; 604/294; 424/429; 523/106

[56] References Cited

U.S. PATENT DOCUMENTS

| 2,117,770 | 5/1938 | Row | 351/160 R |
|---|---|---|---|
| 3,957,049 | 5/1976 | Neefe | 424/429 |
| 3,973,837 | 8/1976 | Page | 351/160 R |
| 3,973,838 | 8/1976 | Page | 351/160 R |
| 4,166,255 | 8/1979 | Graham | 351/160 H |
| 4,786,144 | 11/1988 | Epstein | 351/160 R |
| 5,623,323 | 4/1997 | Johnson et al. | 351/219 |

FOREIGN PATENT DOCUMENTS 0 042 679  12/1981  European Pat. Off. .

*Primary Examiner*—Georgia Epps
*Assistant Examiner*—Jordan M. Schwartz
*Attorney, Agent, or Firm*—Oblon, Spivak, McClelland, Maier & Neustadt, P.C.

[57] ABSTRACT

A weight for a hard contact lens, which can be detachably attached to the peripheral edge of a hard contact lens and which has a groove of a shape corresponding to the peripheral edge of the hard contact lens, formed along the inner periphery of the weight.

15 Claims, 2 Drawing Sheets

DETACHABLE PORTION FOR A HARD CONTACT LENS AND HARD CONTACT LENS COMPOSITE EMPLOYING THE SAME

BACKGROUND OF THE INVENTION

1. Field of the Invention

The present invention relates to a weight for a hard contact lens and a hard contact lens composite employing such a weight. More particularly, it relates to a soft or flexible weight for a hard contact lens, which is designed to be attached to the peripheral edge of a hard contact lens, particularly a multi-focal hard contact lens, to improve the stability of the lens and the comfortableness to the wearer, and a hard contact lens composite employing such a weight.

2. Description of the Background

Heretofore, a hard contact lens, particularly a multi-focal hard contact lens, has had a problem that the positioning of the lens tends to be instable because of its special design. Under the circumstances, various proposals have been made to improve the stability by various lens designs (JP-A-7-239459, JP-A-6-34920, Japanese Patent No. 2539531, JP-A-4-212925 and JP-A-3-107817). However, none of them provides adequate stability.

Further, there have been cases where a patient gives up wearing a hard contact lens, because the hard contact lens is poor in comfortableness to the wearer as compared with a soft contact lens, or a patient stops wearing a hard contact lens because of a miner problem on the cornea, such as 3–9 stain. Under the circumstances, it was proposed to improve the comfortableness to the wearer of a hard contact lens by making the periphery of the lens to be soft (JP-A-3-92336, and JP-A-4-45420). However, such a lens was difficult to produce and thus had a problem that its cost was high. Further, it had an optical problem that its optical region became narrow.

It was also proposed to attach a soft edge to a hard contact lens by polymerization or bonding (JP-A-49-120655, and JP-Y-40-1455). However, it was rather difficult to bond different types of materials, whereby there was a problem of costs, or a problem of poor optical properties. Further, it was proposed to detachably attach a hard contact lens on the outer surface of a soft contact lens base (JP-U-49-95955, JP-U-52-52955, and JP-U-53-22337). However, there were drawbacks such that the center thickness increased, and the oxygen permeability was hindered by the base, so that no adequate oxygen permeability was expected. Furthermore, a composite contact lens was proposed wherein instead of the base, an opening was provided at the center, and an optical member made of inorganic glass was fitted in the opening (JP-A-57-11652). However, as the optical member to be used, a currently available commercial product could not be used, and it had to be separately produced as a special part, thus leading to a problem that the production cost tended to be high.

SUMMARY OF THE INVENTION

Under these circumstances, it is an object of the present invention to provide a weight for a hard contact lens which can easily be prepared and which is able to improve the stability of a hard contact lens and the comfortableness to the wearer, and a hard contact lens composite employing such a weight.

The weight for a hard contact lens of the present invention is a weight which can be detachably attached to the peripheral edge of a hard contact lens and which has a groove of a shape corresponding to the peripheral edge of the hard contact lens, formed along the inner periphery of the weight.

The hard contact lens composite of the present invention comprises a hard contact lens and the above weight for a hard contact lens attached to the peripheral edge of the hard contact lens.

BRIEF DESCRIPTION OF THE DRAWINGS

Now, with reference to the accompanying drawings, the weight for a hard contact lens of the present invention and the hard contact lens composite employing such a weight, will be described.

In the accompanying drawings.

DETAILED DESCRIPTION OF THE PREFERRED EMBODIMENTS

Figure 1:
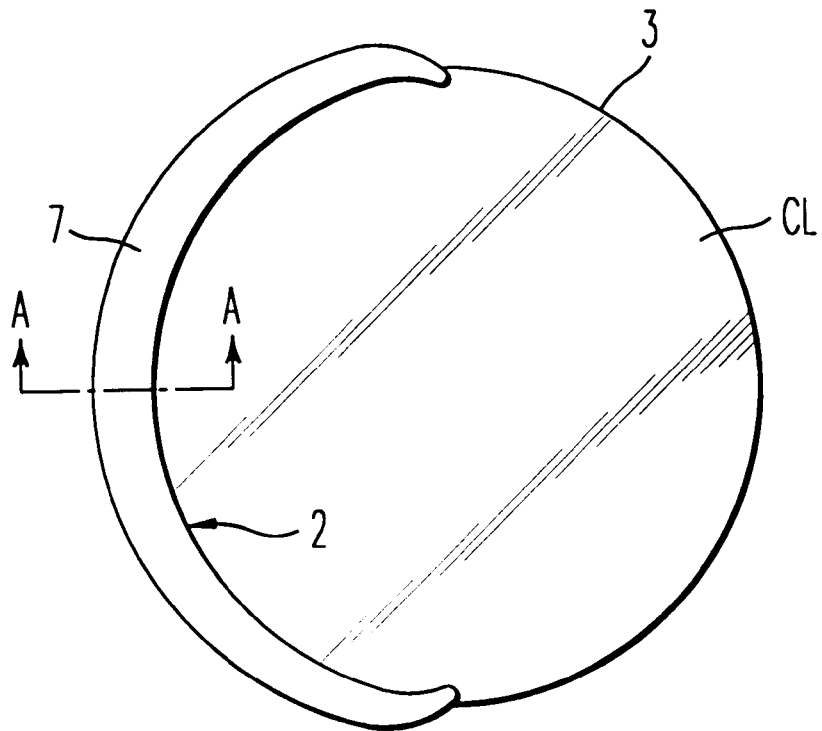
FIG. 1 is a plan view showing an embodiment of the weight for a hard contact lens of the present invention.
Figure 2:
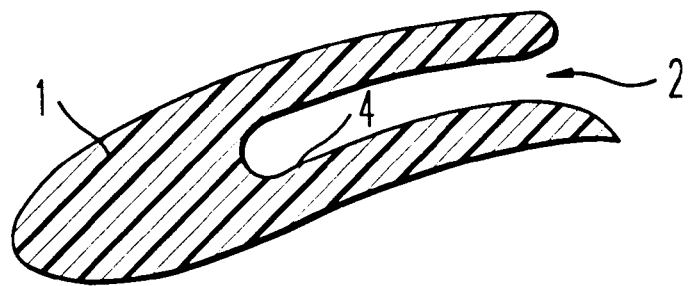
FIG. 2 is a cross sectional view of the weight in FIG. 1.

As shown in FIGS. 1 and 2, a weight 1 for a hard contact lens has a groove 4 of a shape corresponding to the peripheral edge 3 of a hard contact lens CL, formed along its inner periphery 2. The weight 1 has a crescent shape and designed to be detachably attached to the peripheral edge 3 of the hard contact lens CL. The length of the weight 1 can be suitably selected depending upon the type of a hard contact lens CL which depends on the shape of the cornea of a patient. However, it is preferably at a level of from ⅙ to ¾ time of the circumferential length of the above mentioned peripheral edge 3. If it is less than ⅙ time of the circumferential length of the peripheral edge 3, the weight 1 is likely to be easily detached from the hard contact lens CL, and if it exceeds ¾ time, the stability of the hard contact lens tends to be poor.

The above weight 1 is detachably attached, whereby cleaning, disinfection or replacement of the lens can easily be carried out.

As the hard contact lens to be used in the present invention, a common commercial product can be used. For example, it is preferred to employ a hard contact lens with Dk/L (oxygen permeability/thickness of the lens center (cm)) being at least $20 \times 10^{-9} [(cm/sec) \cdot (mlO_2/(ml \times mmHg))]$, which is able to supply adequate oxygen to the cornea.

The material of the above weight 1 is preferably a soft material to improve the comfortableness to the wearer. Such a soft material may, for example, be a copolymer of at least one component selected from water-containing materials, such as a hydroxyalkyl acrylate or a hydroxyalkyl methacrylate, such as hydroxyethyl acrylate or hydroxyethyl methacrylate; an N,N-dialkylacrylamide and an N,N-dialkylmethacrylamide, such as N,N-dimethylacrylamide; and an N-vinylactam such as N-vinylpyrrolidone, a polysaccharide such as dextran, cellulose, starch or gum arabic, crosslinked by e.g. sodium hyaluronate or chondroitin sulfuric acid, or a no-water containing material such as silicone rubber, urethane rubber, an acrylic copolymer or a methacrylic copolymer.

Figure 3:
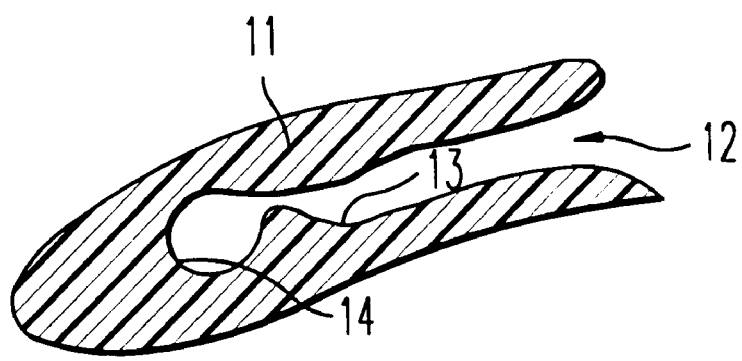
FIG. 3 is a cross sectional view showing another embodiment of the weight for a hard contact lens of the present invention.

In an embodiment of the present invention, the weight preferably has a means for gradually releasing a drug. Such a means for gradually releasing a drug may, for example, be one having a drug coated on the weight, or one having a drug impregnated in the weight. The impregnation method may, for example, be a method of directly immersing the weight in the drug, a method of coating the drug on the weight, a method of incorporating the drug in the above mentioned soft material, followed by molding to prepare a weight, or a method of adding a blowing agent to the above mentioned soft material, followed by molding to obtain a weight, whereupon the drug is impregnated thereto by vacuum. Otherwise, as shown in FIG. 3, as a means for gradually releasing the drug, a pocket 14 capable of retaining a drug, which is formed between the peripheral edge of the hard contact lens and the inner periphery 12 of the weight 11 i.e. at the bottom of the groove 13, may be employed. The drug in this pocket 14 is designed to ooze out from a clearance between the hard contact lens and the weight by a capillary action to the cornea.

The above drug may, for example, be a common ophthalmic agent as disclosed in e.g. JP-A-8-104636, JP-B-59-7684 or JP-A-7-503974, such as lacrimation increasing agent, a cell propagation accelerator, a suppressant against increase of the corneal thickness, a mydriatic, a miotic, an antibiotic, a fungicide, an antihistamine, an anti-inflammatory agent, an anticholinergic, an antiglaucoma compound, an anthelminthick compound, an antivirus agent, a carbonate dehydrarase inhibitor, an antifungal agent, an anaesthetic agent, a peptide or a protein, which is used as a preventive or curing agent for an eye trouble (such as inflammation) or wound, a diagnostic agent or an immunosuppressive agent.

Figure 4:
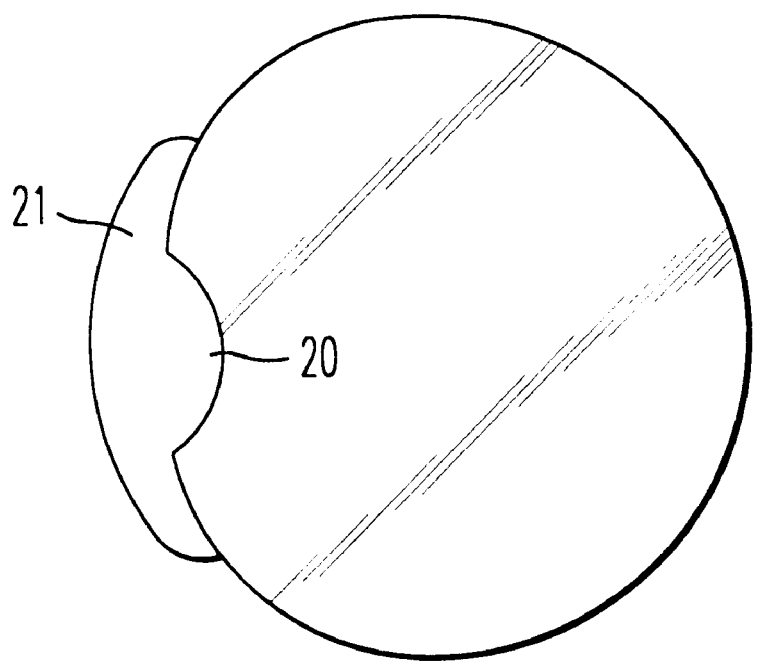
FIG. 4 is a plan view showing still another embodiment of the weight for a hard contact lens of the present invention.

In this embodiment, the weight has a crescent shape. However, the present invention is not limited to such a shape. For example, as shown in FIG. 4, the weight may be made to be a weight 21 having an anchor shape, which has a swelled portion 20 formed at the center. By providing such a swelled portion 20, the weight 21 can be made to be less likely detached than the above weight 1.

Now, the hard contact lens composite employing the weight for a hard contact lens of the present invention, will be described in detail with reference to Examples. However, it should be understood that the present invention is by no means restricted to such specific Examples.

EXAMPLE 1

Firstly, using addition type silicone oil KE106, manufactured by Shinetsu Chemical Industry Co., Ltd., a weight as shown in FIGS. 1 to 2 was prepared by molding. This weight was attached to the peripheral edge of a contact lens Menicon EX, manufactured by Menicon Co., Ltd. to cover the semicircle.

Then, the obtained composite was put on an eye of a person.

As a result, it was reported that good stability and comfortableness like a soft lens were obtained.

EXAMPLE 2

A weight was prepared in the same manner as in Example 1. Then, 0.2 ml of an ophthalmic solution made of a 5% hydrochloric acid calteorol aqueous solution was dropped to the weight by a syringe, and then the weight was attached to the same lens as in Example 1.

Then, such a composite was put on an eye of a rabbit, and 24 hours later, the intraocular tension was measured.

As a result, the intraocular tension was lower than prior to wearing the composite, whereby the effect of the drug was confirmed.

EXAMPLE 3

Firstly, 2-hydroxyethyl methacrylate/N-vinylpyrrolidone/ethylene glycol dimethacrylate=9/1/0.1 (weight ratio) were polymerized to obtain a ring shaped polymer, which was subjected to cutting work to obtain a weight as shown in FIG. 4. After hydration treatment, this weight had a water content of 45% and was flexible. This weight was attached to the same lens as in Example 1.

Then, such a composite was put on an eye of a person.

As a result, it was reported that good stability and comfortableness like a soft lens were obtained.

As described in the foregoing, according to the present invention, the weight can be attached to a commercially available hard contact lens, whereby stability of the hard contact lens and comfortableness to the wearer can be improved at a low production cost. Further, by gradually releasing a drug from the weight, it is possible, for example, to reduce the intraocular tension.

What is claimed is:

1. A detachable portion for a hard contact lens to improve the stability of the lens and the comfortableness thereof to the wearer, which is detachably attachable to a peripheral edge of a hard contact lens and which has a groove of a shape corresponding to the peripheral edge of the hard contact lens, formed along the inner periphery of the detachable portion, wherein said detachable portion has a length which is from about 1/6 to 3/4 of a circumferential length of the peripheral edge of the hard contact lens.

2. The detachable portion for a hard contact lens of claim 1, wherein a pocket is formed at a bottom of the groove.

3. The detachable portion for a hard contact lens of claim 1, wherein the detachable portion is made of a soft material.

4. The detachable portion for a hard contact lens of claim 3, wherein the soft material is a copolymer of at least one component selected from the group consisting of hydroxyalkyl acrylate, hydroxyalkyl methacrylate, N-vinyllactam, N,N-dialkyl acrylamide, and N,N-dialkyl methacrylamide.

5. The detachable portion for a hard contact lens of claim 3, wherein the soft material is a crosslinked polysaccharide.

6. The detachable portion for a hard contact lens of claim 3, wherein the soft material is a silicone rubber or an acrylate polymer.

7. The detachable portion for a hard contact lens of claim 3, which is crescent-shaped.

8. The detachable portion for a hard contact lens of claim 3, which is anchor-shaped.

9. A hard contact lens composite, comprising a hard contact lens and a detachable portion therefor to improve the stability of the lens and the comfortableness thereof to the wearer which is detachably attached to a peripheral edge of the hard contact lens and which has a groove of a shape corresponding to the peripheral edge of the hard contact lens, formed along the inner periphery of the detachable portion, wherein said detachable portion has a length which is from about 1/6 to 3/4 of a circumferential length of the peripheral edge of the hard contact lens.

10. The hard contact lens composite of claim 9, wherein the detachable portion provides for gradual release of a drug.

11. The hard contact lens composite of claim 10, wherein said detachable portion has a drug impregnated therein.

12. The hard contact lens composite of claim 10, which comprises a pocket for containing a drug between the peripheral edge of the hard contact lens and the inner periphery of the detachable portion.

13. The hard contact lens composite of claim 9, wherein said hard contact lens has a value of Dk/L (oxygen permeability/thickness of the lens center (cm)) of at least $20 \times 10^{-9}$ ((cm/sec.)·(mlO$_2$/(ml×mm HG))), whereby oxygen is supplied to a cornea of a wearer.

14. The hard contact lens composite of claim 11, wherein said drug impregnated in said detachable portion comprises an agent for increasing lacrimation, a cell propagation accelerator, a suppressant against corneal thickness, a mydriatic, a miotic, an antibiotic, a fungicide, an antihistamine, an anti-inflammatory compound, an anticholinergic, an antiglaucoma compound, an anthelminthick compound, an antiviral compound, a carbonate dehydrase inhibitor, an anesthetic compound, an anti-inflammatory compound, a diagnostic compound, or an immunosuppressive compound.

15. The hard contact lens composite of claim 12, wherein said pocket contains a drug, which comprises an agent for increasing lacrimation, a cell propagation accelerator, a suppressant against increasing in corneal thickness a mydriatic, a miotic, an antibiotic, a fungicide, an antihistamine, an anti-inflammatory compound, an anticholinergic, an antiglaucoma compound, an anthelminthick compound, an antiviral compound a carbonate dehydrase inhibitor, an anesthetic compound, an anti-inflammatory compound, a diagnostic compound, or an immunosuppressive compound.

* * * * *